US009796233B2

(12) United States Patent
Ding et al.

(10) Patent No.: US 9,796,233 B2
(45) Date of Patent: Oct. 24, 2017

(54) INDEPENDENT SUSPENSION SYSTEM AND CRANE HAVING SAME

(71) Applicant: Xuzhou Heavy Machinery Co., Ltd., Jiangsu (CN)

(72) Inventors: Honggang Ding, Jiangsu (CN); Li Li, Jiangsu (CN); Lei Zhu, Jiangsu (CN); Yunwang Ma, Jiangsu (CN); Jianjun Song, Jiangsu (CN); Fei Ma, Jiangsu (CN)

(73) Assignee: Xuzhou Heavy Machinery Co., Ltd., Jiangsu (CN)

( * ) Notice: Subject to any disclaimer, the term of this patent is extended or adjusted under 35 U.S.C. 154(b) by 0 days.

(21) Appl. No.: 15/035,126

(22) PCT Filed: Apr. 3, 2014

(86) PCT No.: PCT/CN2014/074735
§ 371 (c)(1),
(2) Date: May 6, 2016

(87) PCT Pub. No.: WO2015/109659
PCT Pub. Date: Jul. 30, 2015

(65) Prior Publication Data
US 2016/0375738 A1    Dec. 29, 2016

(30) Foreign Application Priority Data

Jan. 27, 2014  (CN) .......................... 2014 1 0040359

(51) Int. Cl.
*B60G 13/08*    (2006.01)
*B60G 15/12*    (2006.01)
(Continued)

(52) U.S. Cl.
CPC ............... *B60G 13/08* (2013.01); *B60G 3/06* (2013.01); *B60G 3/20* (2013.01); *B60G 11/265* (2013.01);
(Continued)

(58) Field of Classification Search
CPC ........ B60G 3/20; B60G 13/005; B60G 15/08; B60G 15/12; B60G 21/05
See application file for complete search history.

(56) References Cited

U.S. PATENT DOCUMENTS 2,215,751 A * 9/1940 Coleman .................. B60G 3/01
                                                       267/191
3,497,199 A * 2/1970 Tuczek .................. B60G 15/12
                                                       267/64.17
(Continued)

FOREIGN PATENT DOCUMENTS

CN    101195332    6/2008
CN    101618669    1/2010
(Continued)

OTHER PUBLICATIONS

English translation of Office Action dated CN2014379036 dated Jan. 16, 2017 (5 pages).
(Continued)

*Primary Examiner* — Nicole T Verley
(74) *Attorney, Agent, or Firm* — Fish & Richardson P.C.

(57) ABSTRACT

An independent suspension system includes two suspension oil cylinders, respectively arranged between wheels at two sides and a frame: and a steering mechanism, configured to be driven by a steering booster oil cylinder to drive the wheels at two sides to turn. The independent system also includes two swing links arranged corresponding to the wheels at two sides, an end at one side of each of the swing links is hinged to a wheel hub of the wheel at the corre- (Continued)

sponding side via a spherical hinge, and an end at another side of each of the swing links is hinged to a fixing member fixed below a main speed reducer via two spherical hinges respectively along a fore-and-aft direction. A crane having the independent suspension system is further provided.

17 Claims, 7 Drawing Sheets

(51) Int. Cl.

| | | |
|---|---|---|
| B60G 21/05 | (2006.01) | |
| B60G 13/00 | (2006.01) | |
| B60G 3/20 | (2006.01) | |
| B60G 3/06 | (2006.01) | |
| B60G 11/26 | (2006.01) | |
| B62D 7/08 | (2006.01) | |
| B62D 7/14 | (2006.01) | |
| B62D 5/06 | (2006.01) | |
| B66C 9/00 | (2006.01) | |

(52) U.S. Cl.
CPC ............ *B60G 13/005* (2013.01); *B60G 15/12* (2013.01); *B60G 21/05* (2013.01); *B62D 5/06* (2013.01); *B62D 7/08* (2013.01); *B62D 7/144* (2013.01); *B66C 9/00* (2013.01); *B60G 2200/142* (2013.01); *B60G 2300/06* (2013.01)

(56) References Cited

U.S. PATENT DOCUMENTS

| | | | | |
|---|---|---|---|---|
| 4,066,278 A | | 1/1978 | Takagi | |
| 4,306,638 A | | 12/1981 | Malott | |
| 4,355,697 A | * | 10/1982 | Orlandea | B62D 7/06 180/261 |
| 4,405,119 A | * | 9/1983 | Masclet | B60G 15/12 188/288 |
| 4,453,614 A | * | 6/1984 | Allen | B62D 53/02 180/420 |
| 4,659,106 A | * | 4/1987 | Fujita | B60G 21/007 280/124.103 |
| 5,364,114 A | * | 11/1994 | Petersen | B60G 3/20 267/248 |
| 5,941,508 A | * | 8/1999 | Murata | B60G 17/044 267/64.17 |
| 6,092,816 A | * | 7/2000 | Sekine | B60G 17/0152 267/64.17 |
| 6,161,821 A | * | 12/2000 | Leno | B60G 15/12 188/322.19 |
| 6,234,462 B1 | * | 5/2001 | Beck | B60G 17/044 267/64.17 |
| 6,491,129 B1 | * | 12/2002 | Young | B60G 3/20 172/439 |
| 6,619,634 B2 | * | 9/2003 | Chen | A63B 25/08 267/64.17 |
| 6,938,887 B2 | * | 9/2005 | Achenbach | B60G 17/08 188/315 |
| 7,568,562 B2 | * | 8/2009 | Beck | F16F 9/092 188/313 |
| 7,914,025 B2 | * | 3/2011 | Mayen | B60G 3/20 280/124.109 |
| 9,114,846 B1 | * | 8/2015 | Ishikawa | B62K 25/283 |
| 9,586,613 B2 | * | 3/2017 | Shinbori | B60G 3/20 |
| 2009/0033009 A1 | * | 2/2009 | Kirchner | B60G 15/12 267/124 |
| 2009/0133950 A1 | * | 5/2009 | Takemura | B60K 5/00 180/305 |
| 2010/0276901 A1 | * | 11/2010 | Richardson | B60G 3/20 280/93.512 |
| 2010/0307857 A1 | * | 12/2010 | Shinagawa | B62D 5/09 180/421 |
| 2013/0220110 A1 | | 8/2013 | Zhan et al. | |
| 2014/0296089 A1 | * | 10/2014 | Holmes | G01N 35/026 506/9 |
| 2015/0217617 A1 | * | 8/2015 | Leonard | B60G 11/62 280/124.16 |
| 2015/0298729 A1 | * | 10/2015 | Blond | B62D 5/04 180/421 |
| 2016/0272240 A1 | * | 9/2016 | Hanafusa | B62D 7/10 |
| 2017/0015352 A1 | * | 1/2017 | Uranaka | B60G 3/20 |

FOREIGN PATENT DOCUMENTS

| | | | | |
|---|---|---|---|---|
| CN | 201604495 | | 10/2010 | |
| CN | 102039791 | | 5/2011 | |
| CN | 201824820 | | 5/2011 | |
| CN | 202174906 | | 3/2012 | |
| CN | 202946478 | | 5/2013 | |
| CN | 103522865 | | 1/2014 | |
| DE | 2601212 | | 2/1977 | |
| DE | 4116030 C1 | * | 9/1992 | ............ B60G 15/12 |
| DE | 10038267 A1 | * | 2/2002 | ............ B60G 15/067 |
| DE | 102015214554 A1 | * | 2/2017 | ............ B60G 13/14 |
| GB | WO 2013054339 A2 | * | 4/2013 | ............ B62D 7/08 |
| IT | EP 3061672 A1 | * | 8/2016 | ............ B62D 7/144 |
| JP | 2000238999 | | 9/2000 | |
| JP | 2013103665 A | * | 5/2013 | ............ B60G 3/20 |

OTHER PUBLICATIONS

Office Action issued in CA2,926,583 dated Jan. 26, 2017 (4 pages).
Office action dated Jul. 3, 2015 in Chinese Application No. 201410040359.1, 10 pgs.
International Search Report dated Jan. 27, 2014 in PCT Application No. PCT/CN2014/074735, 4 pgs.

* cited by examiner

INDEPENDENT SUSPENSION SYSTEM AND CRANE HAVING SAME

This application is the national phase of International Application No. PCT/CN2014/074735, titled "INDEPENDENT SUSPENSION SYSTEM AND CRANE HAVING SAME", filed on Apr. 3, 2014, which claims the benefit of priority to Chinese Patent Application No. 201410040359.1 titled "INDEPENDENT SUSPENSION SYSTEM AND CRANE HAVING THE SAME", filed with the Chinese State Intellectual Property Office on Jan. 27, 2014, the entire disclosures of both applications are incorporated herein by reference.

FIELD

The present application relates to the technical field of engineering machinery, and particularly to an independent suspension system and a crane having the independent suspension system.

BACKGROUND

It is well known that, for a large heavy-duty all-terrain engineering machinery, the traveling stability of a chassis thereof directly affects an operation performance of the whole machinery. In addition to a chassis power system, a suspension system is also a critical factor affecting the traveling stability.

Taking an all-terrain crane as an example, a suspension system for the chassis thereof generally employs a conventional rigid axle. The suspension system is mainly divided into two types, including a dependent suspension system and an independent suspension system, according to the structural feature of a guide mechanism. In the dependent suspension system, a left wheel and a right wheel are mounted on one integral rigid axle or an axle housing of an non-divided drive axle; however, in the independent suspension system, the left wheel and the right wheel are not connected by one rigid beam or a non-divided axle, but are independently connected to a frame or a body of the crane, thereby forming a divided axle. According to the structural features of the dependent suspension system and the independent suspension system, the suspension system for the chassis of the conventional all-terrain crane is gradually transformed into the independent suspension system.

Reference is made to FIGS. 1 and 2, FIG. 1 is a schematic view showing the structure of a typical independent suspension system in the conventional technology, and FIG. 2 is a schematic side view of FIG. 1.

As shown in the figures, the suspension system has a divided axle, which transmits power to wheel hubs at two sides via two universal drive shafts 10 respectively. A guide sleeve of a suspension oil cylinder 20 is fixed on a frame 30, a lower end of a piston rod is connected to the wheel hub of a wheel, to support the frame and buffer the frame vibration caused by jumping of the axle. A main speed reducer 40 is fixedly connected to the frame, and is connected to the wheel hubs via the universal drive shafts, to realize the transmission of force. A rocker arm 50 of a steering mechanism is mounted on the guide sleeve of the suspension oil cylinder, a rolling bearing is installed between the rocker arm 50 and the guide sleeve, thus the rocker arm 50 is rotatable with respect to the guide sleeve. When the wheel turns, a booster oil cylinder drives the steering rocker arm to rotate, the steering rocker arm drives a trapezoidal knuckle arm fixedly connected to the wheel hub to rotate, thus realizing the steering of the wheels.

However, due to the limitation of its structure, the conventional independent suspension system has the following disadvantages.

Firstly, a lateral surface of the guide sleeve of each of the suspension oil cylinders is connected to the frame, the lower end of each of the piston rods is connected to the wheel hub of the wheel, and the weight of the body and support reactions applied to tires by the ground both act on the suspension oil cylinders, thus the suspension oil cylinders are subjected to a large force and are apt to be wore, which may adversely affect the service life thereof.

Secondly, the whole steering mechanism is mounted above the main speed reducer, and a steering knuckle arm is fixed at an outer side of the guide sleeve of the oil cylinder, thus a minimum clearance between the main speed reducer and the ground cannot be effectively controlled, which leads to a poor traveling trafficability.

In view of this, it is urgent to optimize the design of the independent suspension system in the conventional engineering machinery, to effectively improve a force bearing state of the suspension oil cylinder and to avoid the abrasion that may adversely affect the operational performance and the service life.

SUMMARY

For addressing the above disadvantages, an independent suspension system is provided according to the present application, to reduce or even completely avoid possible damaging affects for a suspension oil cylinder by improving the structure of the independent suspension system, thereby reliably realizing the independent movements of a left wheel and a right wheel, fully using an adhesion condition of a road surface, and greatly improving an operating stability of the overall machinery. On this basis, a crane having the independent suspension system is further provided according to the present application.

An independent suspension system according to the present application includes two suspension oil cylinders, respectively arranged between wheels at two sides and a frame; and a steering mechanism, configured to be driven by a steering booster oil cylinder to drive the wheels at two sides to turn. The independent suspension system further includes two swing links arranged corresponding to the wheels at two sides, an end at one side of each of the swing links is hinged to a wheel hub of the wheel at the corresponding side via a spherical hinge, and an end at another side of each of the swing links is hinged to a fixing member fixed below the frame via two spherical hinges respectively along a fore-and-aft direction.

Preferably, the independent suspension system further includes two energy accumulators, a first energy accumulator of the two energy accumulators has oil ports in communication with a rodless cavity of the suspension oil cylinder at a left side and a rod cavity of the suspension oil cylinder at a right side, and a second energy accumulator of the two energy accumulators has oil ports in communication with a rodless cavity of the suspension oil cylinder at the right side and a rod cavity of the suspension oil cylinder at the left side.

Preferably, each of the suspension oil cylinders includes a piston and a cylinder barrel matching with each other, and further includes an inner-layer protection cover and an outer-layer protection cover. The inner-layer protection cover is sleeved on the cylinder barrel, and has one end fixedly connected to an extension end of a piston rod of the piston and another end provided with an inner position-limiting portion radially extending outwards. The outer-layer protection cover is sleeved on the inner-layer protection cover, and has one end fixedly connected to a bottom of the cylinder barrel and another end provided with an outer position-limiting portion radially extending inwards. The outer position-limiting portion is in a slide fit with an outer wall of the inner-layer protection cover; and in the case that the suspension oil cylinder is in a maximum piston stroke, the inner position-limiting portion is configured to axially abut against the outer position-limiting portion.

Preferably, the extension end of the piston rod of the suspension oil cylinder is fixedly connected to the frame via a flange type end cover, and an elastic gasket for buffering is provided between the extension end of the piston rod and the flange type end cover.

Preferably, the elastic gasket is of a spherical surface shape, the flange type end cover has an inward concave cambered surface matching with an outer surface of the elastic gasket, the extension end of the piston rod has an outward protruding cambered surface matching with an inner surface of the elastic gasket, and a plugging portion orderly passing through the elastic gasket and the flange type end cover is formed by extending from the outward protruding cambered surface axially, an end portion of the plugging portion is fixedly provided with a cover plate, and the cover plate has a cambered surface fitting with a cambered surface of the flange type end cover.

Preferably, an end portion of the piston rod is provided with a rigid connecting member, the outward protruding cambered surface matching with the inner surface of the elastic gasket and the plugging portion are formed on the rigid connecting member, and the cover plate and the rigid connecting member are fixed to the end portion of the piston rod via a bolt.

Preferably, the steering mechanism includes two steering rocker arms, two steering knuckle arms, two steering trapezoidal pull rods and a steering pull rod which are arranged corresponding to the wheels at two sides. The two steering rocker arms each has one end fixedly connected to a wheel hub of the wheel at the corresponding side. The two steering knuckle arms each is pivoted to a respective steering pin fixed to a lower surface of the frame, and is configured to be hinged to a respective steering booster oil cylinder. The two steering trapezoidal pull rods each is hinged between another end of the steering rocker arm and another end of the steering knuckle arm at the corresponding side. The steering pull rod is hinged between the two steering knuckle arms to allow synchronous steering of the two sides. The steering knuckle arms, the steering trapezoidal pull rods and the steering pull rod are all arranged in front of the fixing member, or behind the fixing member.

Preferably, each of the two steering knuckle arms is pivoted to the steering pin at the corresponding side via an embedded bearing.

Preferably, the fixing member is a speed reducer, and has an upper surface fixedly connected to a bottom surface of the frame; two universal drive shafts provided corresponding to the wheels at two sides are each hinged between a respective output end of the speed reducer and a wheel hub speed reducer of the wheel at the corresponding side.

Preferably, each of the swing links is a V-shaped swing link, and two separated ends of the V-shaped swing link are each hinged to a housing of the speed reducer.

A crane according to the present application includes a wheel type chassis, and wheels at two sides of each axle of the chassis are connected to a frame via a respective suspension system, and each of the wheels at two sides of each axle employ the independent suspension system described above.

Compared with the conventional technology, the independent suspension system according to the present application is provided with two swing links, which are respectively arranged corresponding to the wheels at two sides. An end at one side of each of the swing links is hinged to a wheel hub of the wheel at the corresponding side via a spherical hinge, and an end at another side of each of the swing links is hinged to a fixing member fixed below a main speed reducer via two spherical hinges respectively along a fore-and-aft direction. The swing links can rotate around a vehicle forward direction and a direction perpendicular to the ground, thus realizing positioning of tires mounted on the wheel hubs, and ensuring that movements of the tires may meet the design requirements during a travelling process of the crane.

With such an arrangement, two swing links may have dual functions of positioning tires and bearing support reactions from the road surface, thereby ensuring a constant wheel distance when the tires jumps up and down. At the same time, when extending and contracting up and down, the suspension oil cylinders only bear the support reactions from the road surface, thus a force bearing condition thereof is effectively improved, and a transverse rigidity of the suspension system is enhanced. On one hand, severe abrasion caused by a radial force acted between the piston rod and the cylinder barrel of the suspension oil cylinder may be avoided, and meanwhile, the wheel distance of the vehicle may be reliably controlled within an allowable range, thus the action of a lateral force applied to the tires may be effectively reduced, and an abrasion degree of the tires may be decreased. Adhesion condition of the road surface is fully used, a grounding performance of the wheels at two sides may be improved, thus besides the reliability of the suspension system and the operating stability of the vehicle are improved, an operation maintaining cost of the vehicle may be decreased. On the other hand, the independent suspension system according to the present application has the characteristic of having a small unsprung weight, thus an impact load applied on the suspension system and then transferred to the body of the vehicle is small, jumping of the wheel at the left side and jumping of the wheel at the right side does not directly affect each other, which may greatly reduce the phenomenon of inclination and vibration of the body of the vehicle. Moreover, since the wheel distance of the vehicle is reliably controlled within the allowable range, a variation of the wheel distance may be compensated by the elastic deformation of the tire, which will not cause sideslip of the wheels along the road surface, thus guaranteeing the travelling stability of the vehicle, and providing a good use experience for users.

In a preferable solution of the present application, a control principle of the suspension oil cylinder is optimized. A first energy accumulator has oil ports respectively in communication with a rodless cavity of the suspension oil cylinder at the left side and a rod cavity of the suspension oil cylinder at the right side, and a second energy accumulator has oil ports respectively in communication with a rodless cavity of the suspension oil cylinder at the right side and a rod cavity of the suspension oil cylinder at the left side. With this arrangement, taking the case that the wheel at the left side is impacted as an example, the rodless cavity of the suspension oil cylinder at the left side is compressed, a hydraulic oil enters the energy accumulator at the left side, and a hydraulic oil pressure in the energy accumulator at the left side is increased, and at the same time the energy accumulator at the left side supplements the hydraulic oil into the rod cavity of the suspension oil cylinder at the right side, which compresses the rodless cavity of the suspension oil cylinder at the right side, then the hydraulic oil in the rodless cavity of the suspension oil cylinder at the right side enters the energy accumulator at the right side, and a hydraulic oil pressure in the energy accumulator at the right side is increased accordingly. For keeping a balance, the energy accumulator at the right side supplements the hydraulic oil into the rod cavity of the suspension oil cylinder at the left side that is impacted, thus due to a communication effect of the suspension oil cylinders at two sides, the vibration generated by the wheel being impacted can be rapidly damped, thus there is no need to employ an oil cylinder with a complicated structure to realize the vibration damping effect. Moreover, the hydraulic oil in the suspension oil cylinder at one side being impacted enters the rod cavity of the suspension oil cylinder at another side, which may improve a roll stiffness of the overall machinery, and reduce a roll angle of the overall machinery, and the effect is more obvious in a steering process.

In another preferable solution of the present application, the specific structure of the suspension oil cylinder is further optimized. In addition to the piston and the cylinder barrel which are matched, the suspension oil cylinder further includes an inner-layer protection cover and an outer-layer protection cover. The inner-layer protection cover is arranged between an inner side of the cylinder barrel and an outer side of the piston rod, and has one end fixedly connected to an extension end of the piston rod of the piston and another end provided with an inner position-limiting portion radially extending outwards. The outer-layer protection cover is sleeved on the inner-layer protection cover, and has one end fixedly connected to a bottom of the cylinder barrel and another end provided with an outer position-limiting portion radially extending inwards. The outer position-limiting portion is in a slide fit with an outer wall of the inner-layer protection cover to realize the guide effect of the suspension oil cylinder, and at the same time, the piston rod and the cylinder barrel cooperate with each other to realize entering and discharging of oil of the suspension oil cylinder, thus realizing the function of the suspension system. And in the case that the suspension oil cylinder is in a maximum piston stroke, the inner position-limiting portion is configured to axially abut against the outer position-limiting portion, thus the operation performance stability of the suspension oil cylinder may be further improved.

Another preferable solution of the present application further optimizes the application of the drive axle, the speed reducer of the drive axle is directly fixedly connected to a lower surface of the frame, thus a minimum grounding clearance of the whole machinery is effectively increased, and a trafficability of the whole vehicle is apparently improved. Especially when the suspension oil cylinder is extended, the speed reducer and the frame are synchronously raised, and the trafficability of the whole machinery is apparently improved. In addition, a space included angle of arrangement of a transmission system of the whole machinery is decreased, a minimum variation of an included angle of a transmission shaft during the up and down jumping process of the whole vehicle is achieved, and thus the reliability of the transmission system is enhanced. Moreover, each of the trapezoidal pull rods connecting the wheel hubs at the left and right sides and realizing a synchronous rotation angle relationship of the tires at the left side and the right side is of a divided structure, that is the two steering trapezoidal pull rods respectively realize assisting the steering oil cylinder and the synchronous rotation angle relationship of the tires at the left side and the right side. The steering knuckle arms, the steering trapezoidal pull rods and the steering pull rod are all in front of the fixing member or behind the fixing member, such an arrangement may further reduce a distance between the speed reducer and the lower surface of the frame, and improve the trafficability of the whole machinery.

The independent suspension system according to the present application is adapted to the chassis of an engineering machinery of any form, and especially adapted to the crane.

Figure 1:
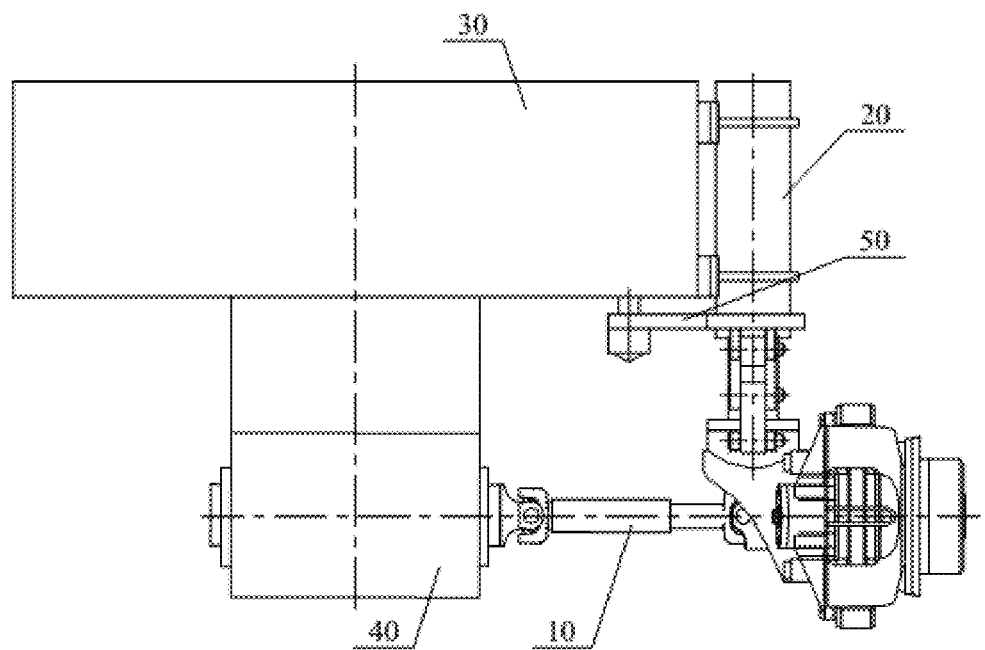
FIG. 1 is a schematic view showing the structure of a typical independent suspension system in the conventional technology.
Figure 2:
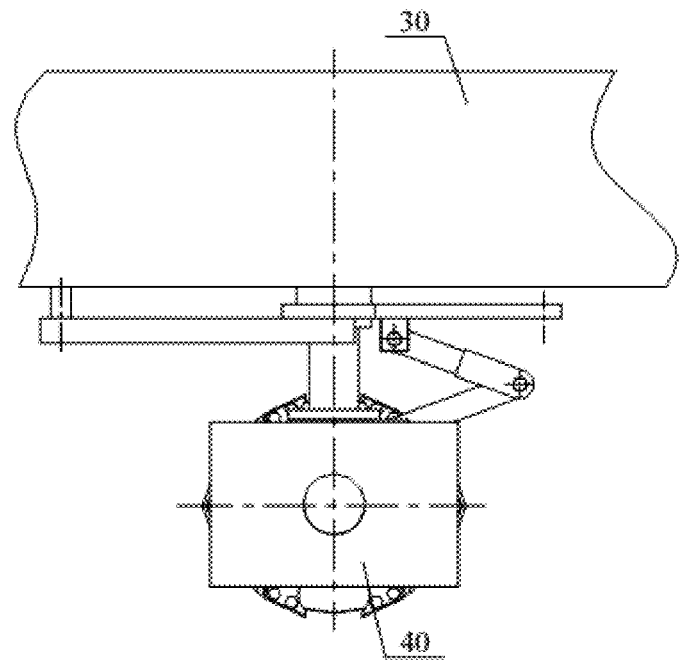
FIG. 2 is a schematic side view of FIG. 1.

| Reference Numerals: | |
| --- | --- |
| 1 suspension oil cylinder, | 11 piston, |
| 111 piston rod, | 1111 outward protruding cambered surface, |
| 1112 plugging portion, | 1113 rigid connecting member, |
| 112 flange type end cover, | 1122 inward concave cambered surface, |
| 113 elastic gasket, | 114 cover plate, |
| 115 bolt, | 12 cylinder barrel, |
| 121 connection flange, | 13 inner-layer protection cover, |
| 131 inner position-limiting portion, | 14 outer-layer protection cover, |
| 141 outer position-limiting portion, | 15 leakage cavity, |
| 21 wheel hub, | 22 wheel hub speed reducer, |
| 3 steering mechanism, | 31 steering rocker arm, |
| 32 steering knuckle arm, | 33 steering pin, |
| 34 steering trapezoidal pull rod, | 35 steering pull rod, |
| 4 V-shaped swing link, | 5 speed reducer, |
| 6 universal drive shaft; | 71 first energy accumulator, |
| 72 second energy accumulator, and | 8 frame. |

DETAILED DESCRIPTION

An independent suspension system is provided according to the present application, which may reduce a radial load on a suspension oil cylinder and ensure independent movements of a left wheel and a right wheel, thereby improving a handling stability of the whole machinery and decreasing a maintenance cost.

Technical solutions of the present application are described in detail in conjunction with drawings and embodiments hereinafter.

Figure 3:
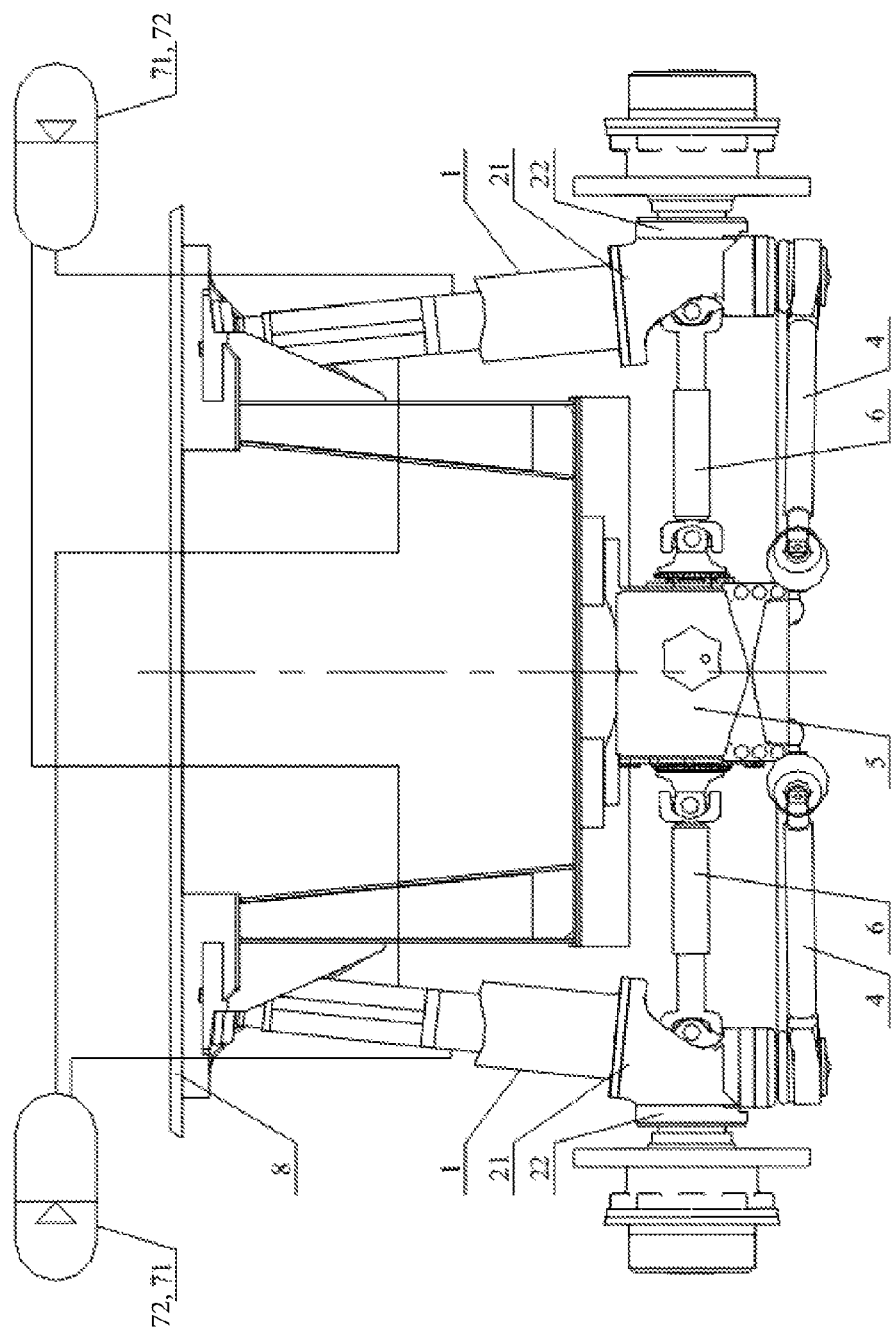
FIG. 3 is a front view of an independent suspension system according to an embodiment of the present application.
Figure 4:
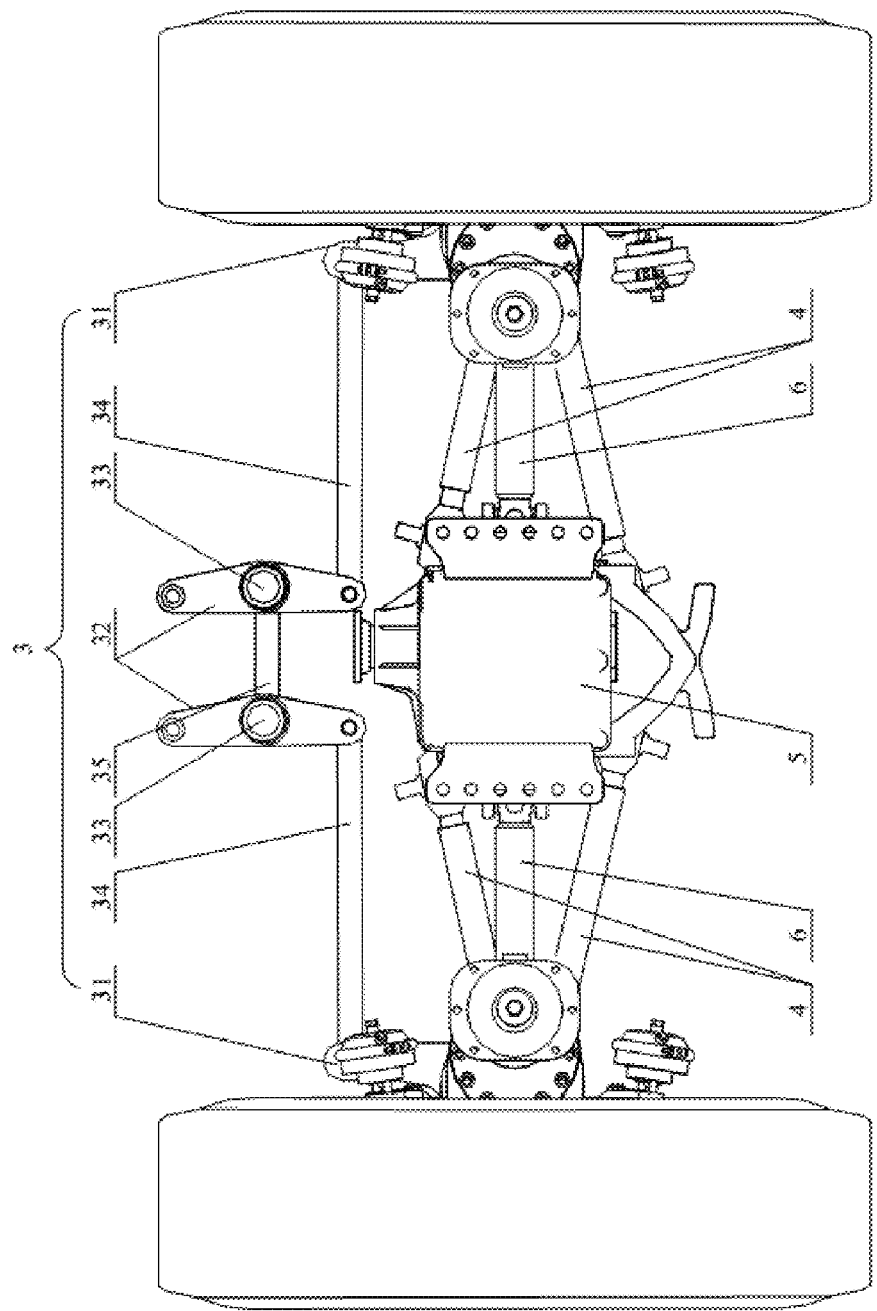
FIG. 4 is a top view of the independent suspension system according to the embodiment of the present application.

Reference is made to FIGS. 3 and 4, FIG. 3 is a front view of an independent suspension system according to an embodiment of the present application, and is formed in a fore-and-aft direction, and FIG. 4 is a top view of the independent suspension system according to the embodiment of the present application.

Without loss of generality, this technical solution is illustrated in detail by taking a steering drive axle as a main part, and it should be understood that, steering and driving functions should not be interpreted as a limitation to the independent suspension system.

Two suspension oil cylinders 1 of the independent suspension system are respectively provided between wheel hubs 21 of wheels at two sides and a frame 8, to buffer and damp the vibration transferred from the road surface to a vehicle body. Each of the suspension oil cylinders 1 has an upper hinge point connected to a support seat on the frame, and a lower hinge point connected to a spherical hinge point on the wheel hub 21 to absorb a perpendicular vibration and buffer the impact. A steering mechanism 3 is configured to be driven by a steering booster oil cylinder (not shown) to drive the wheels at the two sides to turn. In this technical solution, two V-shaped swing links are provided corresponding to the wheels at two sides respectively, each of the V-shaped swing links 4 has a linked end hinged to an upper portion of the wheel hub 21 of the wheel at the corresponding side via a spherical hinge, and two separated ends respectively hinged to a speed reducer 5 fixed below the frame via spherical hinges along a fore-and-aft direction. Here, the speed reducer 5 is an axle main speed reducer for chassis traveling, and has an upper surface fixedly connected to a bottom of the frame 8. The specific structure of the spherical hinge in this specification is not limited to the structure shown in the drawings, and any structure, which can allow two connecting members to rotate around a common sphere center and limit the three-directional movement of the two connecting members, is deemed to fall into the scope of the present application.

Figure 5:
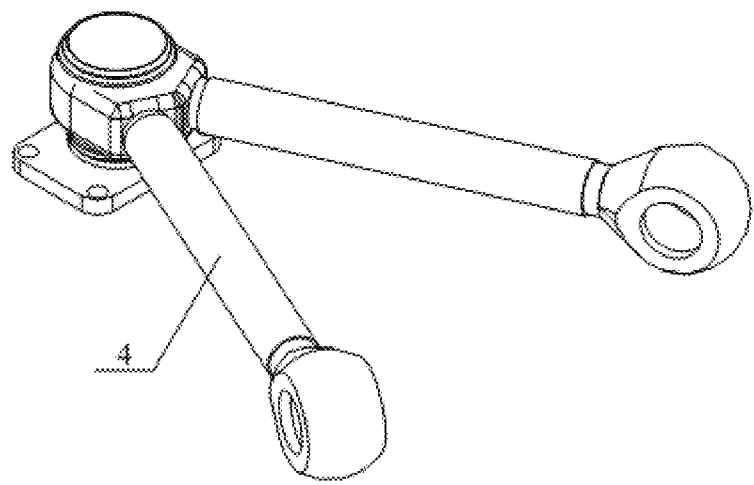
FIG. 5 is an isometric schematic view of a V-shaped swing link of the independent suspension system according to the embodiment of the present application.
Figure 6:
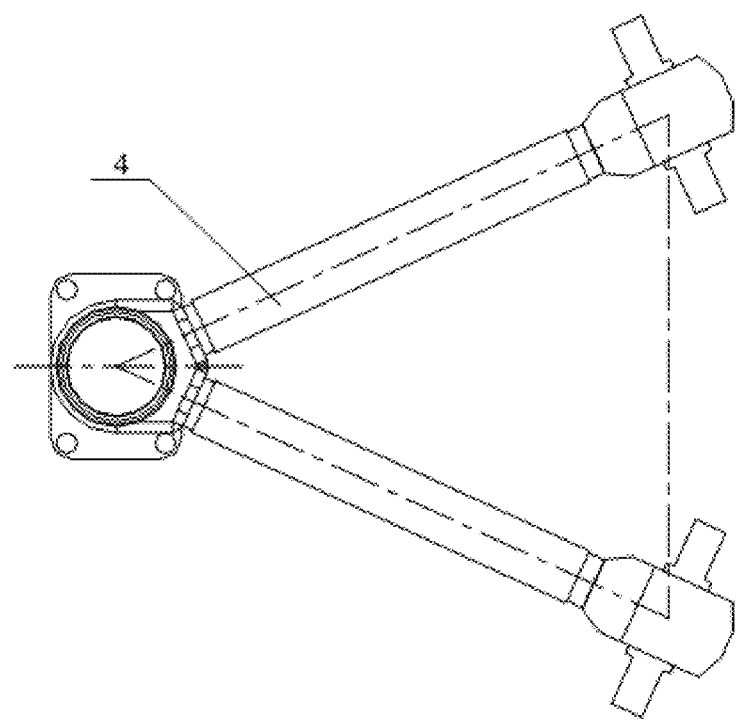
FIG. 6 is a top view of the V-shaped swing link in FIG. 6.

It should be noted that, location terms of "front", "rear", "above", and "below" in this specification are defined by taking the chassis in a driving state as a reference, and obviously, use of these location terms should not be interpreted as a limitation to the technical solution. In addition, the linked end of the V-shaped swing link in this specification indicates a portion where two rods forming the V shape are linked and connected; correspondingly, the two separated ends of the V-shaped swing link indicate portions where the two rods forming the V shape are not linked, that is an open end. Reference is made to FIGS. 5 and 6, FIG. 5 is an isometric schematic view of the V-shaped swing link in this embodiment, and FIG. 6 is a top view of the V-shaped swing link.

In a working state, the two V-shaped swing links 4 may have dual functions of positioning tires and bearing support reactions from the road surface, thereby ensuring a constant wheel distance when the tires jumps up and down. At the same time, when extending and contracting up and down, the suspension oil cylinders only bear the support reactions from the road surface, thus a force bearing condition thereof is effectively improved.

As described hereinabove, this technical solution is not limited to being applied in the drive axle, that is, the technical solution of using the V-shaped swing links 4 in the suspension system may also be adapted to a dead axle. In the case that the axle is a load-bearing axle, a fixing member directly fixed to a lower surface of the frame is employed as a cooperation component to be hinged to the two separated ends of the V-shaped swing link, which realizes an effect equivalent to a load-bearing and connecting function of an outer housing of the speed reducer. In other words, in addition to transferring and outputting a driving force for traveling, the speed reducer in this solution also functions to bear and connect the V-shaped swing links 4. It should be particularly noted that, in this solution the function of the swing link positioning the tire on the wheel hub is described in detail by taking the V-shaped swing link as an example, in fact, the swing link may be of other forms, as long as an end of the swing link at one side is hinged to the wheel hub of the wheel at the corresponding side via a spherical hinge, and ends at another side are respectively hinged to a fixing member fixed below the main speed reducer via two spherical hinges along a fore-and-aft direction.

Of course, a power transmission and output manner of the drive axle may be realized by employing the conventional technology, two universal drive shafts 6 are arranged corresponding to the wheels at two sides, and are each hinged between a respective output end of the speed reducer 5 and a respective wheel hub reducer 22 of the wheel at the corresponding side.

Figure 7:
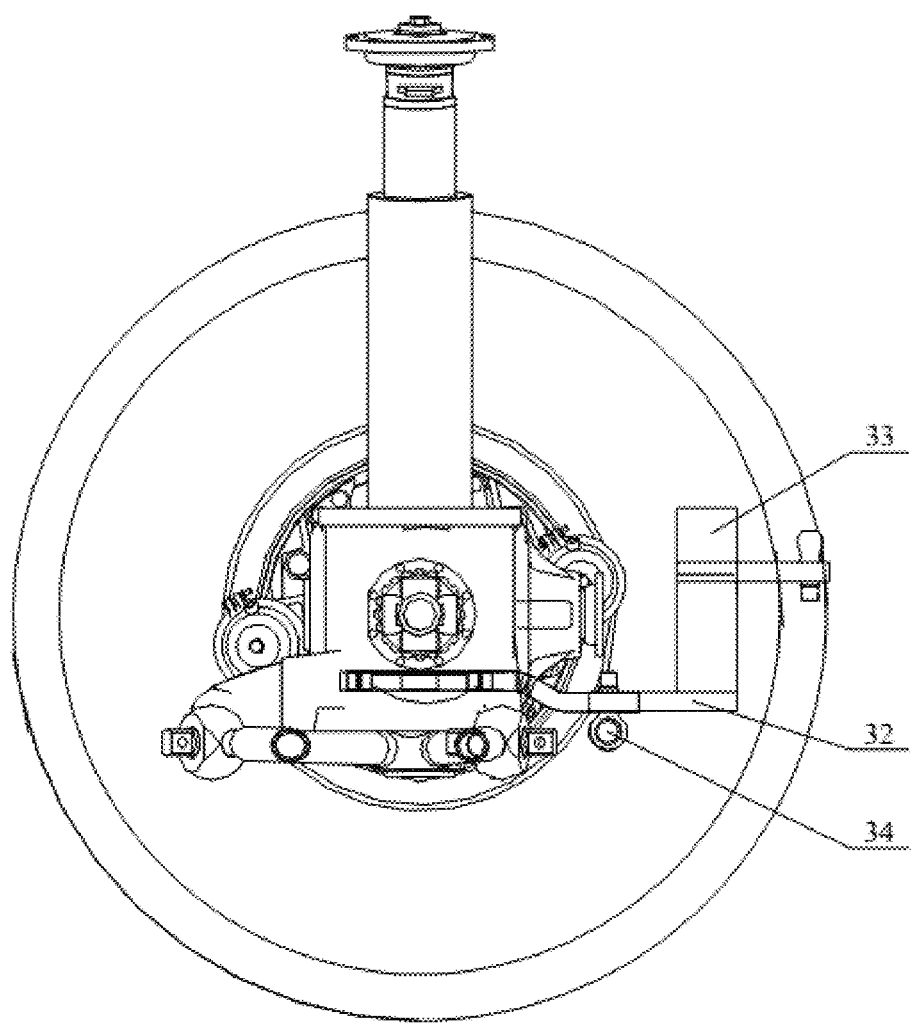
FIG. 7 is a side view of the independent suspension system in FIG. 3.

In this solution, the steering mechanism for realizing a steering operation may be further optimized to obtain a better trafficability of the whole machinery. Reference is further made to FIG. 7, which is a side view of the independent suspension system in FIG. 3, and the wheel at one side is omitted for clearly showing the steering mechanism.

Reference is made to FIGS. 3, 4 and 7, the steering mechanism has trapezoidal pull rods configured to realize a synchronous steering angle relationship of the wheels at two sides, and the trapezoidal pull rods employ a divided structure, and are arranged corresponding to the wheels at two sides. Each of two steering rocker arms 31 has a first end hinged to the wheel hub 21 of the wheel at the corresponding side, to allow a steering driven force to be acted on the wheel. Two steering knuckle arms 32 are pivoted to steering pins 33 fixed to a lower plane of the frame 8 respectively, and each has a first end configured to be hinged to a steering booster oil cylinder (not shown). Each of two steering trapezoidal pull rods 34 is hinged between a second end of the steering rocker arm 31 and a second end of the steering knuckle arm 32 at the corresponding side, to connect wheel mechanisms at two sides. A steering pull rod 35 is hinged between the two steering knuckle arms 32, to realize a synchronous steering of the two sides. The steering knuckle arms 32, the steering trapezoidal pull rods 34, and the steering pull rod 35 are all located in front of the speed reducer 5 (the fixing member), thus increasing the minimum ground clearance of the overall machinery, and remarkably improving the trafficability of the vehicle. Of course, according to an overall arrangement requirement of the overall machinery, the steering knuckle arms 32, the steering trapezoidal pull rods 34, and the steering pull rod 35 may also be arranged behind the speed reducer 5. Each of the steering knuckle arms 32 is pivoted to the steering pin 33 at the corresponding side via an embedded bearing (not shown), to realize a rolling function of the steering mechanism in the assembly process of the steering mechanism, and the embedded bearing is assembled on the steering pin 33, to allow the trapezoidal mechanism to rotate freely when it turns.

For achieving a better vibration damping effect, the control of the suspension oil cylinders at two sides may be optimized in this solution. As shown in FIG. 3, in two energy accumulators, a first energy accumulator 71 has oil ports respectively in communication with a rodless cavity of the suspension oil cylinder 1 at the left side and a rod cavity of the suspension oil cylinder 1 at the right side, and a second energy accumulator 72 has oil ports respectively in communication with a rodless cavity of the suspension oil cylinder 1 at the right side and a rod cavity of the suspension oil cylinder 1 at the left side. Taking the case that the wheel at the left side is impacted as an example, the rodless cavity of the suspension oil cylinder at the left side is compressed, a hydraulic oil enters the energy accumulator at the left side, and a hydraulic oil pressure in the energy accumulator at the left side is increased, and at the same time the energy accumulator at the left side supplements the hydraulic oil into the rod cavity of the suspension oil cylinder at the right side, which compresses the rodless cavity of the suspension oil cylinder at the right side, then the hydraulic oil in the rodless cavity of the suspension oil cylinder at the right side enters the energy accumulator at the right side, and a hydraulic oil pressure in the energy accumulator at the right side is increased accordingly. For keeping a balance, the energy accumulator at the right side supplements the hydraulic oil into the rod cavity of the suspension oil cylinder at the left side that is impacted, thus due to a communication effect of the suspension oil cylinders at two sides, the vibration generated by the wheel being impacted can be rapidly damped, thus there is no need to employ an oil cylinder with a complicated structure to realize the vibration damping effect. Moreover, the hydraulic oil in the suspension oil cylinder at one side being impacted enters the rod cavity of the suspension oil cylinder at another side, which may improve a roll stiffness of the overall machinery, and reduce a roll angle of the overall machinery, and at the same time realize the matching and combination of a hydropneumatic suspension control and an independent suspension axle, thereby dramatically decreasing an unsprung weight, and improving a ride performance of the overall machinery.

Figure 8:
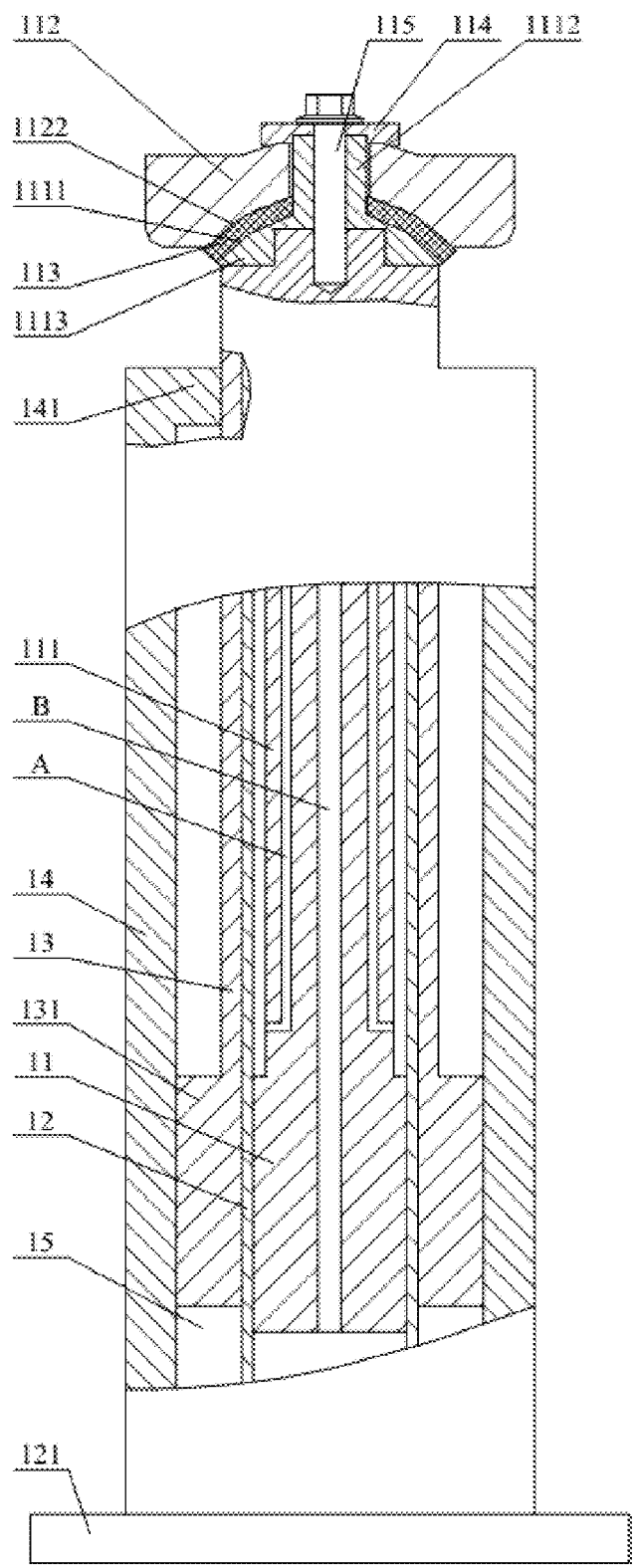
FIG. 8 is an isometric schematic view of a suspension oil cylinder of the independent suspension system according to the embodiment of the present application.
Figure 9:
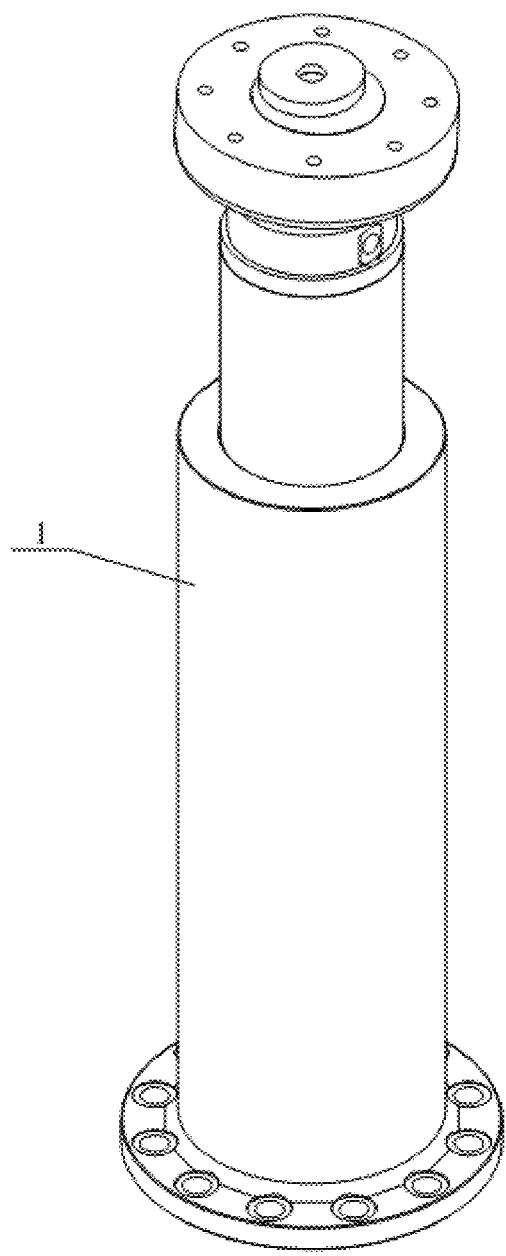
FIG. 9 is a sectional view of the suspension oil cylinder in FIG. 8

Besides, the structure of the suspension oil cylinder 1 may be further optimized. Reference is made to FIGS. 8 and 9, FIG. 8 is an isometric schematic view of the suspension oil cylinder in this embodiment, and FIG. 9 is a sectional view of the suspension oil cylinder in FIG. 8. In addition to a piston 11 and a cylinder barrel 12 which are matched, the suspension oil cylinder 1 further employs a double-layer protection cover to further enhance the vibration damping function.

An inner-layer protection cover 13 of the suspension oil cylinder 1 is sleeved on the cylinder barrel 12, one end of the inner-layer protection cover 13 is fixedly connected to an extension end of a piston rod 111 of the piston 11 and is axially movable synchronously with the piston rod 111, and another end of the inner-layer protection cover 13 has an inner position-limiting portion 131 radially extending outward. An outer-layer protection cover 14 of the suspension oil cylinder 1 is sleeved on the inner-layer protection cover 13, one end of the outer-layer protection cover 14 is fixedly connected to a bottom of the cylinder barrel 12, that is, the outer-layer protection cover 14 and the cylinder barrel 12 are fixed with respect to each other, and another end of the outer-layer protection cover 14 has an outer position-limiting portion 141 radially extending inward. On one hand, the outer position-limiting portion 141 is in a slide fit with an outer wall of the inner-layer protection cover 13, that is, when the inner-layer protection cover 13 moves synchronously with the piston rod 111, the outer-layer protection cover 14 and the cylinder barrel 12 don't move with respect to each other, there is a relative slide between the outer position-limiting portion 141 of the outer-layer protection cover 14 and the outer wall of the inner-layer protection cover 13, in this way, the outer position-limiting portion 141 cooperates with the piston rod of the suspension oil cylinder to provide a guide function, to realize reliable positioning of the tires at two sides. Moreover, the inner position-limiting portion 131 and the outer position-limiting portion 141 are respectively formed by extending radially, which allows a main body of the inner-layer protection cover 13 to be spaced from a main body of the outer-layer protection cover 14, thereby forming a leakage cavity 15 for accommodating leakage oil, to further improve a sealing performance of the suspension oil cylinder 1. It should be understood that, the outer-layer protection cover 14 may be fixed to the wheel hub at the corresponding side via a bolt or other connection manners.

Besides, in the case that the suspension oil cylinder is at a maximum operating stroke, the inner position-limiting portion 131 axially abuts against the outer position-limiting portion 141, thereby providing a position-limiting function, and improving a force bearing condition of a head portion of the piston 11 at an extreme position.

In this solution, one end of the piston rod of the suspension oil cylinder 1 is fixedly connected to the frame 8 via a flange type end cover 112, and one end of the cylinder barrel 12 of the suspension oil cylinder 1 is fixedly connected to the corresponding wheel hub 21 via a connection flange 121. For further preventing the vibration from adversely affecting the suspension oil cylinder 1 in the operating process, a buffering elastic gasket 113 may be provided between the extension end of the piston rod 111 and the flange type end cover 112, to avoid abrasion of the suspension oil cylinder 1 caused by the up and down jumping of the axle and an inclination force. The elastic gasket 113 is of a spherical surface shape, the flange type end cover 112 has an inward concave cambered surface 1122 matching with an outer surface of the elastic gasket 113. Similarly, the extension end of the piston rod 111 has an outward protruding cambered surface 1111 matching with an inner surface of the elastic gasket 113, and a plugging portion 1112 is formed by extending from the outward protruding cambered surface 1111 axially, and orderly passes through the elastic gasket 113 and the flange type end cover 112. An end portion of the plugging portion 1112 is fixedly provided with a cover plate 114, and the cover plate 114 has a cambered surface fitting with a cambered surface of the flange type end cover 112, to adapt to a displacement of the suspension oil cylinder 1 with respect to the frame. Thus, deformation of the elastic gasket 113 may avoid a friction between the piston rod and a guide sleeve of the suspension oil cylinder 1 caused by the jumping of the tires.

It should be understood that, the outward protruding cambered surface 1111 and the plugging portion 1112 may be machined and formed on the body of the piston rod 111, that is being formed integrally; or, a rigid connecting member 1113 may be provided at the end portion of the piston rod 111, and the outward protruding cambered surface 1111 matching with the inner surface of the elastic gasket 113 and the plugging portion 1112 can be formed on the rigid connecting member 1113, thus a machining difficulty and a machining cost may be reduced. The cover plate 114 and the rigid connecting member 1113 are fixed at the end portion of the piston rod 111 via a bolt 115.

Herein, oil passages of two cavities of each of the suspension oil cylinders 1 are both provided in the piston rod 111, a rod cavity oil passage A and a rodless cavity slide passage B are respectively in communication with the two cavities, which may be realized by employing the conventional technology, thus will not be described in detail hereinafter.

In addition to the independent suspension system, a crane using the independent suspension system is further provided according to this embodiment, and wheels at both sides of each axle of a wheel type chassis of the crane are connected to a frame via the independent suspension systems, to allow tires at the left and right sides to independently move, and fully use an adhesion condition of the road surface, thereby improving a handling stability of the overall crane. It should also be noted that, a chassis construction, an electrical system, a winch system, a power system and other function components may each be implemented by the conventional technology, thus will not be described in detail in this specification.

The embodiments described hereinabove are only exemplary embodiments of the present application. It should be noted that, a few improvements or modifications may be made by those skilled in the art without departing from the principle of the present application. The scope of the present application is defined by the claims.

The invention claimed is:

1. An independent suspension system, comprising:
   two suspension oil cylinders, respectively arranged between wheels at two sides and a frame; and
   a steering mechanism, configured to drive the wheels at two sides to turn;
   wherein the independent suspension system further comprises two swing links arranged corresponding to the wheels at two sides, an end at one side of each of the swing links is hinged to a wheel hub of the wheel at the corresponding side via a spherical hinge, and an end at another side of each of the swing links is hinged to a fixing member fixed below a main speed reducer via two spherical hinges respectively along a fore-and-aft direction; and
   wherein the independent suspension system further comprises two energy accumulators, a first energy accumulator of the two energy accumulators has oil ports in communication with a rodless cavity of the suspension oil cylinder at a left side and a rod cavity of the suspension oil cylinder at a right side, and a second energy accumulator of the two energy accumulators has oil ports in communication with a rodless cavity of the suspension oil cylinder at the right side and a rod cavity of the suspension oil cylinder at the left side.

2. The independent suspension system according to claim 1, wherein each of the suspension oil cylinders comprises a piston and a cylinder barrel matching with each other, and further comprises:
   an inner-layer protection cover, sleeved on the cylinder barrel, and having one end fixedly connected to an extension end of a piston rod of the piston and another end provided with an inner position-limiting portion radially extending outwards; and
   an outer-layer protection cover, sleeved on the inner-layer protection cover, and having one end fixedly connected to a bottom of the cylinder barrel and another end provided with an outer position-limiting portion radially extending inwards, and the outer position-limiting portion being in a slide fit with an outer wall of the inner-layer protection cover; and
   wherein in the case that the suspension oil cylinder is in a maximum piston stroke, the inner position-limiting portion is configured to axially abut against the outer position-limiting portion.

3. The independent suspension system according to claim 2, wherein the extension end of the piston rod of the suspension oil cylinder is fixedly connected to the frame via a flange type end cover, and an elastic gasket for buffering is provided between the extension end of the piston rod and the flange type end cover.

4. The independent suspension system according to claim 3, wherein the elastic gasket is of a spherical surface shape, the flange type end cover has an inward concave cambered surface matching with an outer surface of the elastic gasket, the extension end of the piston rod has an outward protruding cambered surface matching with an inner surface of the elastic gasket, and a plugging portion orderly passing through the elastic gasket and the flange type end cover is formed by extending from the outward protruding cambered surface axially, an end portion of the plugging portion is fixedly provided with a cover plate, and the cover plate has a cambered surface fitting with a cambered surface of the flange type end cover.

5. The independent suspension system according to claim 4, wherein an end portion of the piston rod is provided with a rigid connecting member, the outward protruding cambered surface matching with the inner surface of the elastic gasket and the plugging portion are formed on the rigid connecting member, and the cover plate and the rigid connecting member are fixed to the end portion of the piston rod via a bolt.

6. The independent suspension system according to claim 1, wherein the steering mechanism comprises the following components arranged corresponding to the wheels at two sides:
   two steering rocker arms, each having one end fixedly connected to a wheel hub of the wheel at the corresponding side;
   two steering knuckle arms, each being pivoted to a respective steering pin fixed to a lower surface of the frame, and being configured to assist with steering;
   two steering trapezoidal pull rods, each being hinged between another end of the steering rocker arm and another end of the steering knuckle arm at the corresponding side; and
   a steering pull rod, hinged between the two steering knuckle arms to allow synchronous steering of the two sides; and
   wherein, the steering knuckle arms, the steering trapezoidal pull rods and the steering pull rod are all arranged in front of the fixing member, or behind the fixing member.

7. The independent suspension system according to claim 6, wherein each of the two steering knuckle arms is pivoted to the steering pin at the corresponding side via an embedded bearing.

8. The independent suspension system according to claim 1, wherein the fixing member is an axle main speed reducer, and has an upper surface fixedly connected to a bottom surface of the frame; two universal drive shafts provided corresponding to the wheel hubs at two sides are each connected between a respective output end of the main speed reducer and a wheel hub speed reducer of the wheel at the corresponding side.

9. The independent suspension system according to claim 8, wherein each of the swing links is a V-shaped swing link, and two separated ends of the V-shaped swing link are each hinged to a housing of the speed reducer.

10. A crane, comprising a wheel type chassis, and wheels at two sides of each axle of the chassis being connected to a frame via a respective suspension system, wherein each of the wheels at two sides of each axle employ an independent suspension system; the independent suspension system comprises:
- two suspension oil cylinders, respectively arranged between wheels at two sides and a frame; and
- a steering mechanism, configured to be driven by a steering booster oil cylinder to drive the wheels at two sides to turn;
- wherein the independent suspension system further comprises two swing links arranged corresponding to the wheels at two sides, an end at one side of each of the swing links is hinged to a wheel hub of the wheel at the corresponding side via a spherical hinge, and an end at another side of each of the swing links is hinged to a fixing member fixed below a main speed reducer via two spherical hinges respectively along a fore-and-aft direction; and
- wherein the independent suspension system further comprises two energy accumulators, a first energy accumulator of the two energy accumulators has oil ports in communication with a rodless cavity of the suspension oil cylinder at a left side and a rod cavity of the suspension oil cylinder at a right side, and a second energy accumulator of the two energy accumulators has oil ports in communication with a rodless cavity of the suspension oil cylinder at the right side and a rod cavity of the suspension oil cylinder at the left side.

11. The crane according to claim 10, wherein the extension end of the piston rod of the suspension oil cylinder is fixedly connected to the frame via a flange type end cover, and an elastic gasket for buffering is provided between the extension end of the piston rod and the flange type end cover.

12. The crane according to claim 11, wherein the elastic gasket is of a spherical surface shape, the flange type end cover has an inward concave cambered surface matching with an outer surface of the elastic gasket, the extension end of the piston rod has an outward protruding cambered surface matching with an inner surface of the elastic gasket, and a plugging portion orderly passing through the elastic gasket and the flange type end cover is formed by extending from the outward protruding cambered surface axially, an end portion of the plugging portion is fixedly provided with a cover plate, and the cover plate has a cambered surface fitting with a cambered surface of the flange type end cover.

13. The crane according to claim 12, wherein an end portion of the piston rod is provided with a rigid connecting member, the outward protruding cambered surface matching with the inner surface of the elastic gasket and the plugging portion are formed on the rigid connecting member, and the cover plate and the rigid connecting member are fixed to the end portion of the piston rod via a bolt.

14. The crane according to claim 10, wherein each of the suspension oil cylinders comprises a piston and a cylinder barrel matching with each other, and further comprises:
- an inner-layer protection cover, sleeved on the cylinder barrel, and having one end fixedly connected to an extension end of a piston rod of the piston and another end provided with an inner position-limiting portion radially extending outwards; and
- an outer-layer protection cover, sleeved on the inner-layer protection cover, and having one end fixedly connected to a bottom of the cylinder barrel and another end provided with an outer position-limiting portion radially extending inwards, and the outer position-limiting portion being in a slide fit with an outer wall of the inner-layer protection cover; and
- wherein in the case that the suspension oil cylinder is in a maximum piston stroke, the inner position-limiting portion is configured to axially abut against the outer position-limiting portion.

15. The crane according to claim 10, wherein the steering mechanism comprises the following components arranged corresponding to the wheels at two sides:
- two steering rocker arms, each having one end fixedly connected to a wheel hub of the wheel at the corresponding side;
- two steering knuckle arms, each being pivoted to a respective steering pin fixed to a lower surface of the frame, and being configured to assist with steering;
- two steering trapezoidal pull rods, each being hinged between another end of the steering rocker arm and another end of the steering knuckle arm at the corresponding side; and
- a steering pull rod, hinged between the two steering knuckle arms to allow synchronous steering of the two sides; and
- wherein, the steering knuckle arms, the steering trapezoidal pull rods and the steering pull rod are all arranged in front of the fixing member, or behind the fixing member.

16. The crane according to claim 10, wherein the fixing member is an axle main speed reducer, and has an upper surface fixedly connected to a bottom surface of the frame; two universal drive shafts provided corresponding to the wheel hubs at two sides are each connected between a respective output end of the main speed reducer and a wheel hub speed reducer of the wheel at the corresponding side.

17. The crane according to claim 16, wherein each of the swing links is a V-shaped swing link, and two separated ends of the V-shaped swing link are each hinged to a housing of the speed reducer.

* * * * *

UNITED STATES PATENT AND TRADEMARK OFFICE
CERTIFICATE OF CORRECTION

PATENT NO. : 9,796,233 B2
APPLICATION NO. : 15/035126
DATED : October 24, 2017
INVENTOR(S) : Honggang Ding et al.

Page 1 of 1

It is certified that error appears in the above-identified patent and that said Letters Patent is hereby corrected as shown below:

In the Claims

In Column 13, Lines 11-12, Claim 10, after "to" delete "be driven by a steering booster oil cylinder to".

Signed and Sealed this
Twenty-fourth Day of April, 2018

Andrei Iancu
*Director of the United States Patent and Trademark Office*